United States Patent [19]

Mathur et al.

[11] Patent Number: 5,499,109
[45] Date of Patent: Mar. 12, 1996

[54] SYSTEM FOR TRANSFERRING MESSAGES BETWEEN INPUT AND OUTPUT DEVICES IN A COMMUNICATION DEVICE

[75] Inventors: Sharad Mathur, Redmond; Arul Menezes, Bellevue; Michael R. VanBuskirk; Kevin T. Gallo, both of Redmond, all of Wash.

[73] Assignee: Microsoft Corporation, Redmond, Wash.

[21] Appl. No.: 198,364

[22] Filed: Feb. 18, 1994

[51] Int. Cl.$^6$ ..................................... H04N 1/00
[52] U.S. Cl. ................. 358/400; 358/402; 358/403; 358/407; 358/468; 358/442
[58] Field of Search ................... 358/400, 401, 358/402, 403, 407, 434, 440, 442, 468

[56] References Cited

U.S. PATENT DOCUMENTS

| | | | |
|---|---|---|---|
| 3,751,582 | 8/1973 | Wernikoff | 178/6 |
| 4,970,603 | 11/1990 | Kanai | 358/400 |
| 4,994,926 | 2/1991 | Gordon et al. | 358/400 |
| 5,041,915 | 8/1991 | Hirota et al. | 358/407 |
| 5,142,594 | 8/1992 | Sugishima | 382/56 |
| 5,287,199 | 2/1994 | Zoccolillo | 358/402 |

FOREIGN PATENT DOCUMENTS

| | | | |
|---|---|---|---|
| 0412461A2 | 2/1991 | European Pat. Off. | H04N 1/32 |
| 63-074366 | 4/1988 | Japan | H04N 1/00 |
| 2154348 | 9/1985 | United Kingdom | H03M 7/00 |

OTHER PUBLICATIONS

"Tuesday. Telecompaq from Compaq," Teleconnect, May 1985, pp. 151–152.
Freiberger, P., "The Best of Both Worlds," Popular Computing, Jul. 1985, pp. 62–64 and 128–130.
Machrone, B., "Hotlines to Hybrids," PC Magazine, May 28, 1985, pp. 34–35.

Primary Examiner—Edward L. Coles, Sr.
Assistant Examiner—Thomas D. Lee
Attorney, Agent, or Firm—Seed and Berry

[57] ABSTRACT

A method and system for processing messages is provided. In a preferred embodiment of the present invention, a message scheduler, a job process, and a format resolution module are used. The message scheduler identifies when a new message is to be processed, schedules the new message for processing, invokes the format resolution module to determine a method of converting data in the message to an appropriate format for a destination device or file, and invokes a job process. The format resolution module determines an appropriate method for converting data in the message from a format acceptable to the source devices or files to a format acceptable to the destination devices or files and creates a target message containing a reference to a destination device or file. The job process sends the data between the source devices or files to a destination device or file and performs the appropriate conversion. The preferred embodiment of the present invention is designed to allow for the support of new devices and new data formats with little change to the existing system through the use of a building block methodology. Therefore, new devices and data formats can be supported in an easy and efficient manner.

4 Claims, 11 Drawing Sheets

5,499,109

SYSTEM FOR TRANSFERRING MESSAGES BETWEEN INPUT AND OUTPUT DEVICES IN A COMMUNICATION DEVICE

TECHNICAL FIELD

The present invention relates generally to communication devices and, more, particularly, to the transferring of messages by a communication device.

BACKGROUND OF THE INVENTION

Facsimile machines allow users to send and/or receive documents via telephone lines. FIG. 1 depicts a conventional facsimile machine 100. The facsimile machine 100 is connected to a telephone line 110. The facsimile machine 100 contains a modem 106, a memory 104, a central processing unit (CPU) 102, a primer 108, and a scanner 112. The modem 106 is used for converting received messages from the telephone line 110 from an analog format into a digital format. The modem 106 also converts data received from the CPU 102 from a digital format to an analog format for transmission across the telephone line 110. When a message is sent, the CPU 102 is responsible for receiving digital data from the memory 104, compressing the digital data and sending the digital data to the modem 106. In addition, the CPU 102 is responsible for receiving digital data from the modem 106, sending the digital data to the memory 104, and decompressing the digital data when a message is received. The memory 104 is used for storing digital data while the digital data is being sent or received. The printer 108 is an output device responsible for receiving digital data from the CPU 102 and for printing the digital data. The scanner 112 is an input device responsible for receiving a document, digitizing the document, and sending the digitized data to the CPU 102.

Conventional facsimile machines are a type of communication device that processes messages in a very limited fashion. Conventional facsimile machines perform the function of receiving messages from a telephone line and printing the received messages, as well as scanning documents and transmitting the scanned data across telephone lines. Conventional facsimile machines do not use other devices than a modem, printer and scanner nor can conventional facsimile machines delay the processing of messages.

SUMMARY OF THE INVENTION

In accordance with a first aspect of the present invention, a method is executed in a communication device having a number of devices and files. In accordance with this method of the first aspect of the present invention, at least one device or file is designated as the message source and at least one device or file is designated as the message sink. Further, in accordance with this method of the first aspect of the present invention, the communication device contains a message store for storing messages, a job process for sending data in a message from the message source to the message sink, a renderer library and a format resolution module. This method processes messages by first viewing the message store. After viewing the message store, this method schedules all new messages contained in the message store. When a message in the message store is a target message, this method spawns a job process to process the target message. When a message in the message store is a source message, this method determines the message sink for the source message and invokes the format resolution module.

In accordance with a second aspect of the present invention, the communication device includes a message scheduler, a job process, and a format resolution module. The message scheduler provides for invoking job processes for each message and for invoking the format resolution module for each message. The job process provides for sending data from a message source to a message sink and for converting the data. The format resolution module provides for creating a topology list of renderers for converting the data from a format acceptable to the message source to a format acceptable to the message sink.

DETAILED DESCRIPTION OF THE INVENTION

A preferred embodiment of the present invention provides for an improved communication device for processing messages that provides more functionality than a conventional facsimile machine. The preferred embodiment of the present invention provides the ability to transmit and receive messages from many different types of devices or files. Moreover, the preferred embodiment can transmit a message received from many devices or files to many devices or files. In addition, the preferred embodiment of the present invention converts data received from a device or file into a format acceptable to another device or file. As a result, data, such as documents, may be readily directed to different Input and Output ("I/O") devices. The preferred embodiment of the present invention is designed to allow for the support of new devices and new data formats with little change to the existing system through the use of a building block methodology. Therefore, new devices and data formats can be supported in an easy and efficient manner.

Although the preferred embodiment of the present invention is described relative to a facsimile machine, one skilled in the art will recognize that the present invention can be practiced with other I/O devices or communication devices.

The preferred embodiment of the present invention provides three functions in a facsimile machine which will be discussed in more detail below: a send function, a receive function, and a copy function. The send function allows a user to send data from one or more devices or files ("message sources") to one or more other devices or files ("message sinks"). The copy function allows a user to copy data from the scanner to the printer. The receive function allows the user to receive data from the modem and send the data to a preferred device of the user. The receive function is performed automatically by the preferred embodiment without user intervention. Although the preferred embodiment of the present invention is described as providing three functions, one skilled in the art will recognize that the present invention may provide other functions.

Figure 1:
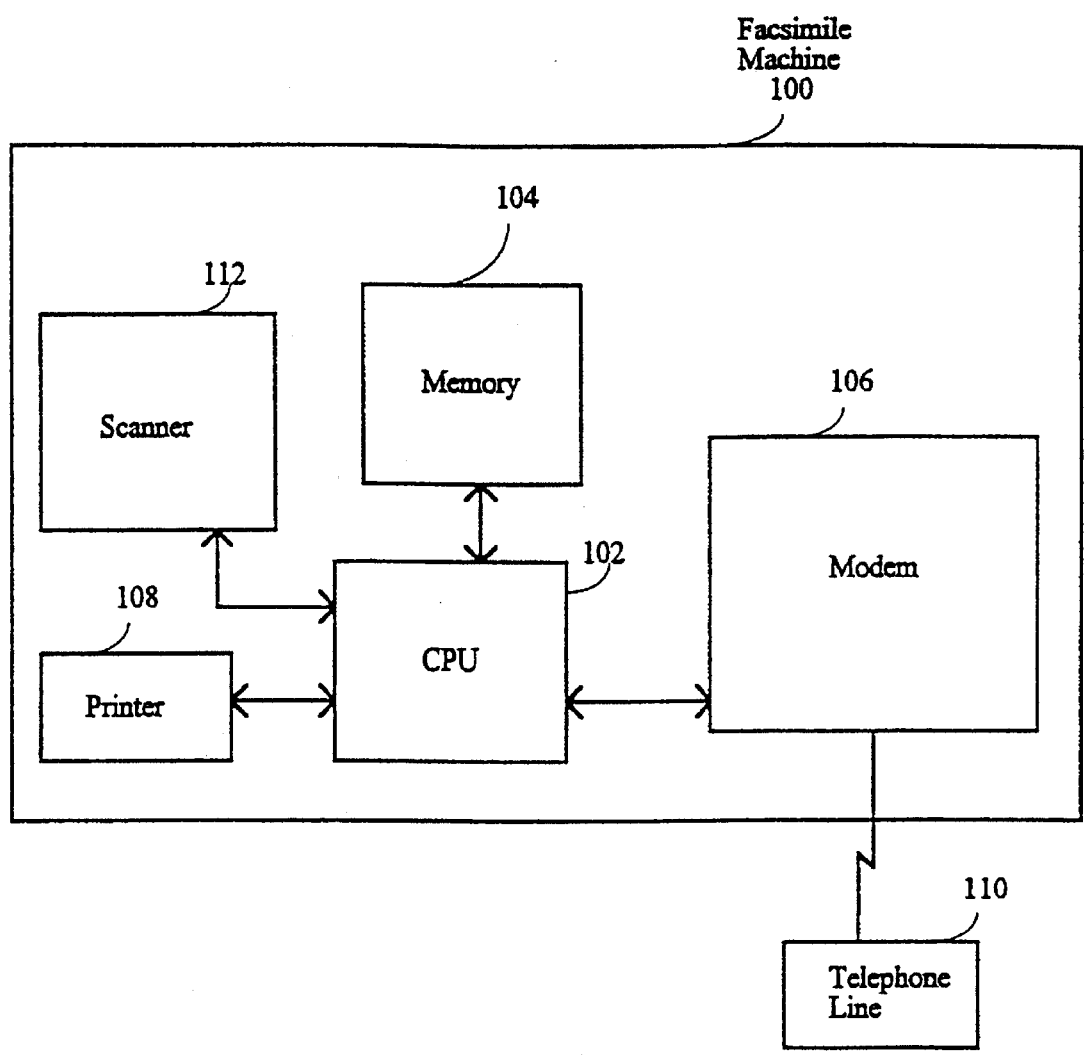
FIG. 1 depicts a block diagram of a conventional facsimile machine.
Figure 2:
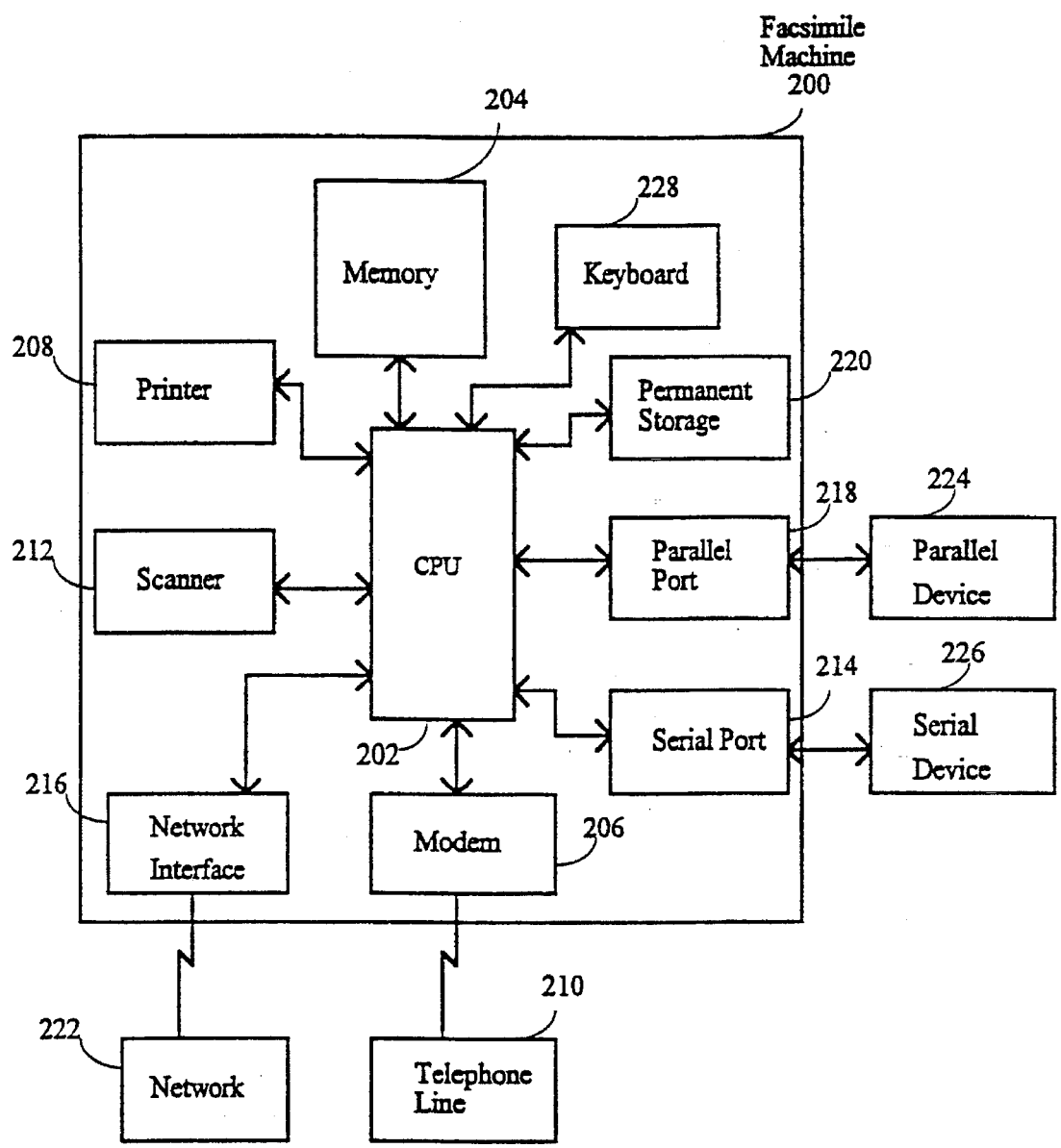
FIG. 2 depicts a block diagram of a communication device suitable for practicing the preferred embodiment of the present invention.

FIG. 2 depicts a block diagram of a facsimile machine suitable for practicing the preferred embodiment of the present invention. The facsimile machine 200 is connected to a telephone line 210, a network 222, a parallel device 224 and a serial device 226. The facsimile machine 200 contains a memory 204, a central processing unit (CPU) 202, a keyboard 228, a printer 208, a scanner 212, a network interface 216, a modem 206, a serial port 214, a parallel port 218, and a permanent storage device 220. Although the preferred embodiment is described as containing one of each type of device, one skilled in the art will recognize that the preferred embodiment may be used with more than one of each type of device. The memory 204 is used as a storage area for messages as the messages are processed in the facsimile machine 200. The memory 204 can be any of a number of different types of memory, including, but not limited to, dynamic random access memory and static random access memory. The CPU 202 processes messages contained in the memory 204 and is responsible for sending and receiving data from the permanent storage 220, the keyboard 228, the parallel port 218, the serial port 214, the network 216, the modem 206, the scanner 212, and the printer 208.

The keyboard 228 is an input device that allows the user to input information and commands into the facsimile machine 200 for processing by the CPU 202. The printer 208 is an output device that is responsible for receiving data from the CPU 202 and for printing the received data. The scanner 212 is an input device that accepts documents, digitizes the data contained in the document into a digital format, and sends the digital data to the CPU 202. The network interface 216 acts as an entry point to a network 222. The network interface 216 is responsible for receiving data from other devices on the network 222 and sending the received data to the CPU 202, and for receiving data from the CPU 202 and sending the received data to other devices on the network 222. The network 222 can be any of a number of different networks including, but not limited to, local area networks and wide area networks. The modem 206 is responsible for receiving digital data from the CPU 202 and for converting the digital data into an analog format for transmission across the telephone line 210. In addition, the modem 206 is responsible for receiving analog data from the telephone line 210, for converting the analog data into a digital format, and for sending the digital data to the CPU 202. The serial port 214 is an access point to other devices that communicate in a serial manner (i.e., a serial device 226). The term "Serial" refers to the transmission of data in a bit by bit sequential manner as opposed to parallel transmission wherein all the bits of a group of data are sent simultaneously. The types of devices that can be connected to a serial port are other computers or peripheral devices. The parallel port 218 acts as an access point to devices that communicate in a parallel manner (i.e., a parallel device 224). An example of a parallel device is a parallel printer. A parallel printer, for example, instead of receiving data in a serial manner (bit by bit), receives one byte of data (8 bits) at a time. The permanent storage 220 is a non-volatile storage device for storing data in between invocations of the facsimile machine 200. An example of a permanent storage device 220 is a hard disk.

Although the preferred embodiment of the present invention is described as being practiced on a facsimile machine like that shown in FIG. 2, one skilled in the art will recognize that the present invention may be practiced with other facsimile machine configurations, and the facsimile machine 200 may interface with other components.

Figure 3:
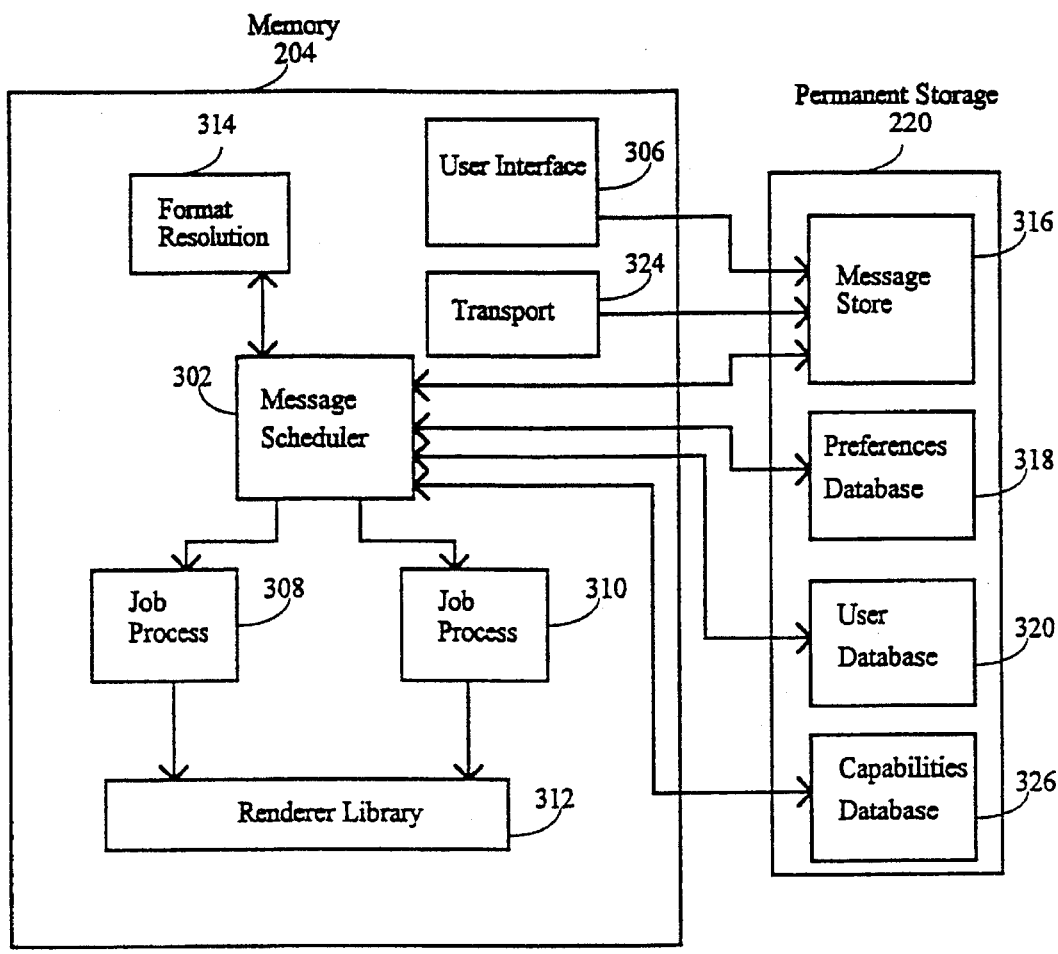
FIG. 3 depicts a more detailed block diagram of the memory and the permanent storage of a communication device suitable for practicing the preferred embodiment of the present invention.

FIG. 3 depicts a more detailed block diagram of the memory 204 and the permanent storage 220 of the facsimile machine 200 and illustrates the interactions between the depicted components. The memory 204 contains a user interface process 306, a transport process 324, a message scheduler 302, a format resolution module 314, a renderer library 312, and two job processes 308, 310. The permanent storage 220 contains a preferences database 318, a user database 320, a capabilities database 326, and a message store 316. The user interface process 306 is responsible for receiving commands and information from a computer user through the keyboard 228. In response to the received commands and information from the keyboard 228, the user interface process 306 creates messages and stores the created messages into the message store 316. Two commands in particular that the user interface 306 allows the user to input are the send command and the copy command. The transport process 324 is responsible for receiving data from the modem 206 or other device, creating a message from the received data, and then storing the message into the message store 316. The message scheduler 302 is responsible for viewing the message store 316. Upon viewing the message store 316, the message scheduler 302 identifies new messages, processes the new messages, and updates the status of the messages in the message store 316. The format resolution module 314 is a dynamically linked library module that is responsible for determining a method for converting a message from a format acceptable to a source device or file to a format acceptable to a destination device or file and for formatting the message according to the preferences of the computer user. The source devices or files are referred to as the "Message Sources" and the destination devices or files are referred to as the "Message Sinks". A "dynamically linked library module" is a shared library module that is linked at run time. Although some components of the preferred embodiment are described as dynamically linked libraries, one skilled in the an will recognize that the dynamically linked libraries can be statically linked libraries, processes, functions, modules, or other software entities. The format resolution module 314 determines a method for converting data in a message by creating a topology list of renderers. A "renderer" is a function in the renderer library 312 that is responsible for converting data from one format into another. A "topology list of renderers" refers to a group of renderers in a specific order in which each renderer is to be executed for conversion of the data from a format acceptable to the message source to a format acceptable to the message sink. The job process 308, 310 is responsible for invoking renderers from the renderer library 312 in the order that the topology list dictates and for sending data between the message source and the message sink.

The preferences database 318 maintains the preferences of each user of the facsimile machine 200 for a preferred message sink for a received message as well as formatting preferences for a message. In using the preferences database 318, the destination user name is used as an index and an identifier of the preferred message sink and formatting preferences for that user name are returned. "Formatting" refers to additional information added to a message that does not vary the content of the message. The term "formatting" includes overlays which are stylistic information added to a message much like headers or footers are added to a document. Also, the term "formatting" includes branding which refers to adding time and date information to a message when a message is printed. Therefore, the preferences database 318 contains user preferences for a preferred message sink as well as formatting preferences. The user database 320 is used to determine the address and message sink for a specific user. In using the user database 320, the destination user name is used as an index and an address for the destination user is returned with an identifier of a message sink. The capabilities database 326 is used to determine the data format acceptable to a message sink. The capabilities database 326 has an entry for each device in the facsimile machine 200 and the data formats (capabilities) acceptable to the devices. The message store 316 acts as the repository for all messages in the facsimile machine 200.

Figure 4:
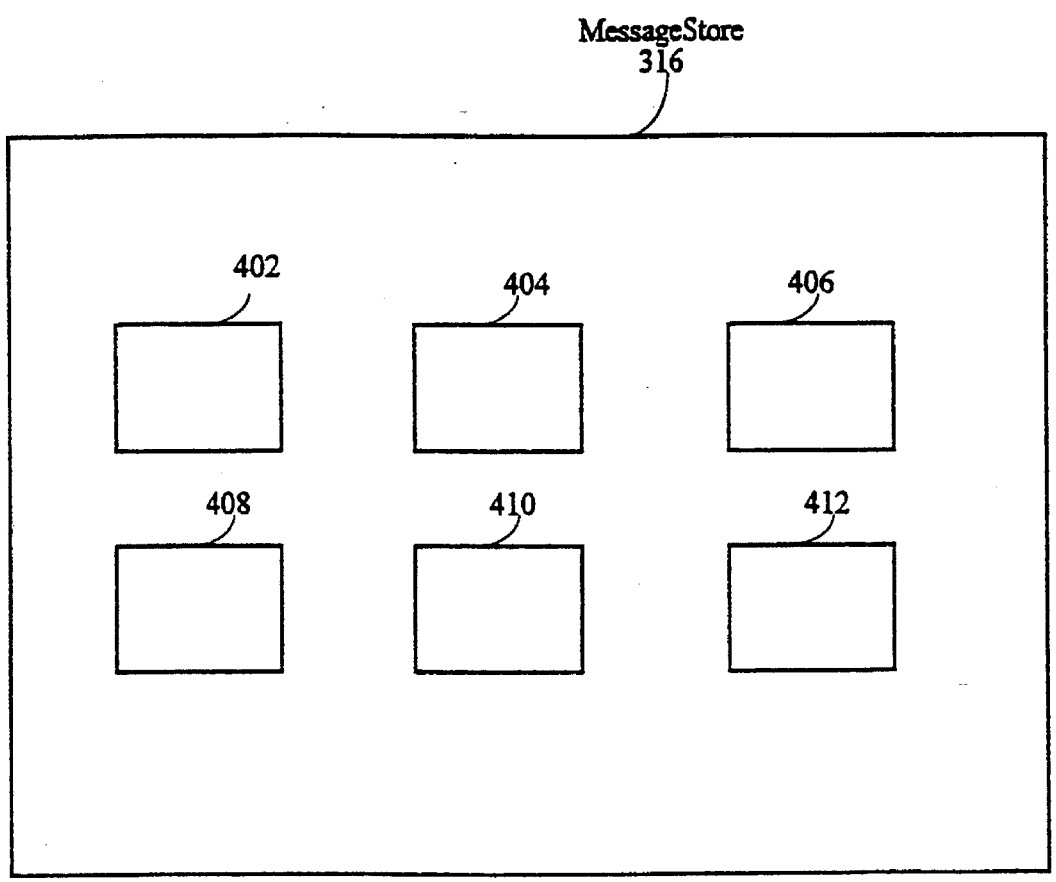
FIG. 4 depicts a more detailed block diagram of the message store.
Figure 5:
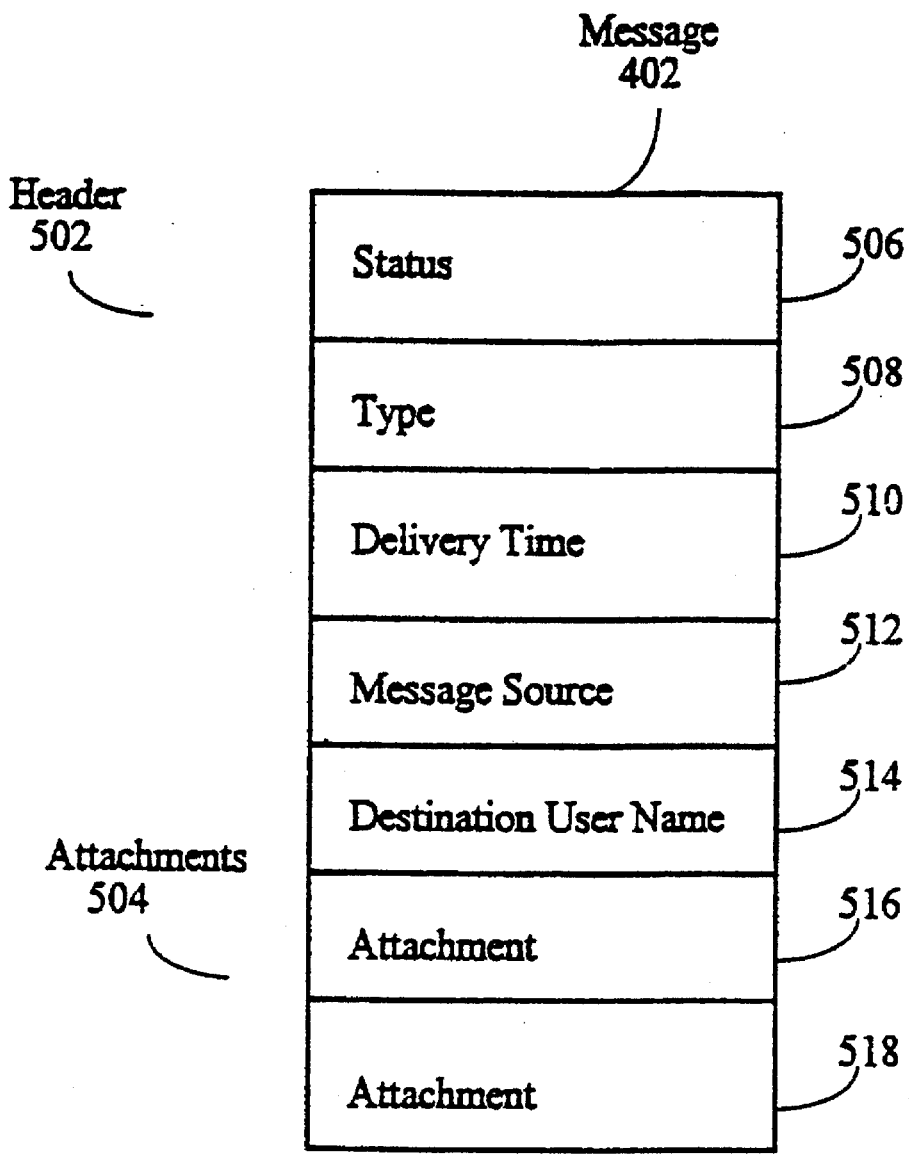
FIG. 5 depicts a more detailed diagram of a message in the message store.

FIG. 4 depicts a more detailed block diagram of the message store 316. The message store 316 is a storage unit for messages in the facsimile machine 200. The message store 316 as depicted contains six messages 402, 404, 406, 408, 410, and 412. FIG. 5 depicts a more detailed diagram of message 402. Although message 402 is depicted, the other messages contained in the message store 316 have the same structure. Message 402 contains a header portion 502 and an attachments portion 504. The header portion 502 contains a status field 506, a type field 508, a delivery time field 510, a message source field 512, and a destination user name field 514. The attachments portion 504 contains each attachment of the message 514, 516. The status field 506 indicates the stage of processing of the message. A message can be a new message, a schedulable message, or a completed message. A new message is a message that has been deposited into the message store 316 by the user interface process 306 or the transport process 324, but has not yet been processed by the message scheduler 302. A schedulable message in the message store 316 is a message where the time for delivery of the message has been reached. A completed message in the message store is a message where transmission of the referenced data has been completed. The type field 508 is used to indicate whether the message is a source message or a target message. A source message is a message that contains references (e.g., pipes and filenames) to the source data that is to be sent. A target message is a message that refers to the message sink. A "pipe" is a reference to a communication channel in memory where data is transferred to and from a device. The delivery time field 510 is used to indicate the date and time for which delivery is to occur. A message is not schedulable until the date and time in the delivery time field 510 has been reached. The message source field 512 contains an identifier of the source devices or files from which the data is to be received (i.e., the message source). An attachment 514, 516 to a message is a reference to data that is a filename, a pipe, or a direct reference to a device. A message may contain many attachments. Although the message 402 may contain many attachments, the data referenced in the message is considered by the preferred embodiment to be one message.

Figure 6:
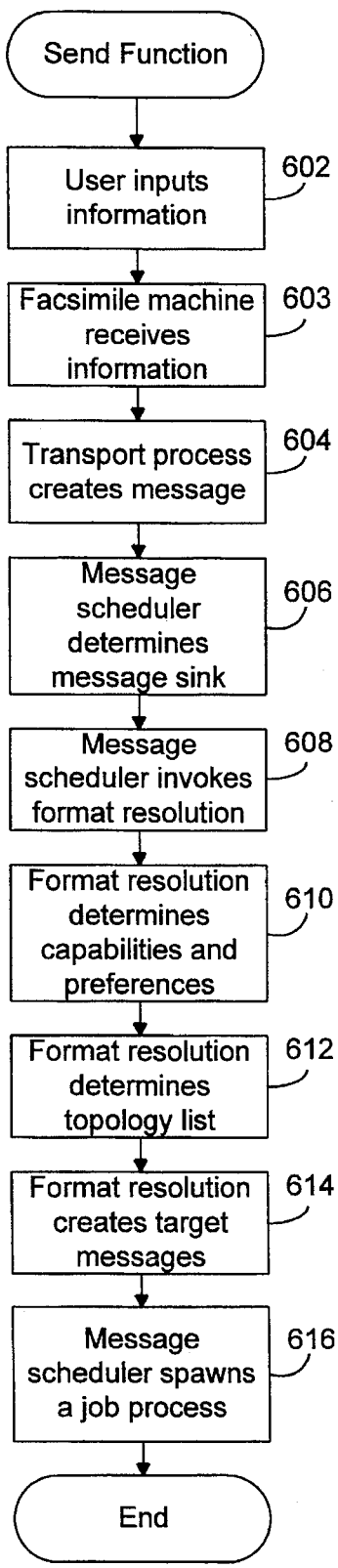
FIG. 6 depicts a flow chart of the steps performed by the preferred embodiment for a send function.

To illustrate the interactions of the components of the preferred embodiment, consider the following example of the send function and the receive function. FIG. 6 depicts a flow chart of the steps performed by the preferred embodiment during the send function. In this example, a remote user initiates the send function. First, the remote user inputs commands and information to a remote personal computer ("PC") (step 602). The remote user inputs information such as the date and time for delivery, the source device or file, and the destination user name. Then the PC sends the information to the facsimile machine 200, wherein the facsimile machine 200 receives the information through the serial port 214 and sends the information to the transport process 324 (step 603). The transport process 324 next creates a message from the received user information, marks the created message as being new, and stores the new message into the message store 316 (step 604). Upon finding a new message in the message store 316, the message scheduler 302 determines the message sink for the message by accessing the user database 320 with the destination user name 514 (step 606). The message scheduler 302 accesses the user database 320 with the destination user name 514 and the user database 320 returns the address and message sink of the destination user. The message scheduler 302 then invokes the format resolution module 314 to create a topology list of renderers and to create a target message for each destination (message sink) of the message (step 608). The format resolution module 314 determines the capabilities of each message sink by accessing the capabilities database 326 and determines the formatting preferences of the computer user by accessing the preferences database 318 (step 610). The format resolution module 314 then determines a topology list of renderers to convert each attachment in the message from a format acceptable to the message source to a format acceptable to each message sink (step 612). The format resolution next creates a target message for each message sink (step 614). After receiving the results from the format resolution module 314, the message scheduler 302 spawns one job process 308, 310 for each message sink to send data from the source message, through the renderers, and to the target message (step 616).

If a send were performed by a local user, the preferred embodiment follows similar steps to those discussed above except that the user information is input from the keyboard 228 or other input device and the user information is sent to the user interface process 306. The user interface process 306 then creates a message from the user information and deposits the created message into the message store 316. In addition, the steps performed by the preferred embodiment for the copy function are similar to the steps performed by the preferred embodiment for the send function except that, for the copy function, the message sink has been predetermined to be the printer.

Figure 7:
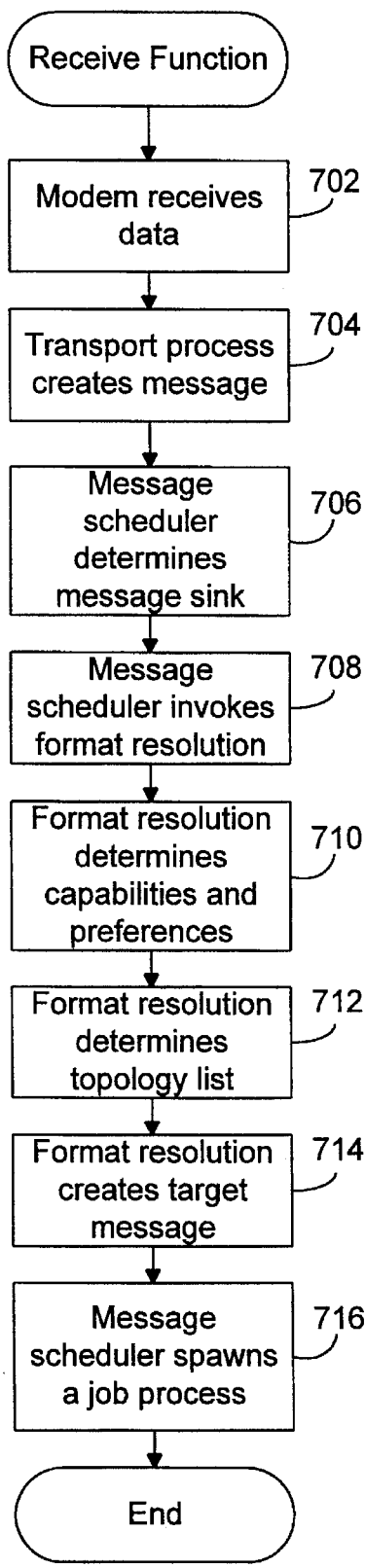
FIG. 7 depicts a flow chart of the steps performed by the preferred embodiment for a receive function.

FIG. 7 depicts a flow chart of the steps performed by the preferred embodiment for the receive function. First, the modem 206 receives data from another (sending) modem (step 702). The transport process 324 is then notified that the modem 206 has received data. After being notified, the transport process 324 creates a message, marks the created message as new, and stores the new message in the message store 316 (step 704). Upon finding the new message in the message store 316, the message scheduler 302 determines the message sink for the message (step 706). The message scheduler 302 determines the message sink by accessing the preferences database 318. The message scheduler 302 accesses the preferences database with the destination user name 514 and the preferences database returns an identifier of the preferred message sink for the destination user. The message scheduler 302 then invokes the format resolution module 314 to create a topology list of renderers and to create a target message (step 708). The format resolution module 314 then determines the capabilities of the message sink by accessing the capabilities database 326 and determines the formatting preferences of the computer user by accessing the preferences database 318 (step 710). Next, the format resolution module 314 creates a topology list of renderers for converting the data from a format acceptable to the modem 206 to a format acceptable to the message sink (step 712). The format resolution module 314 then creates a target message (step 714). After receiving the results of the format resolution module 314, the message scheduler 302 spawns a job process 308, 310 for sending the data from the modem, through the renderers, and to the message sink (step 716).

Figure 8A:
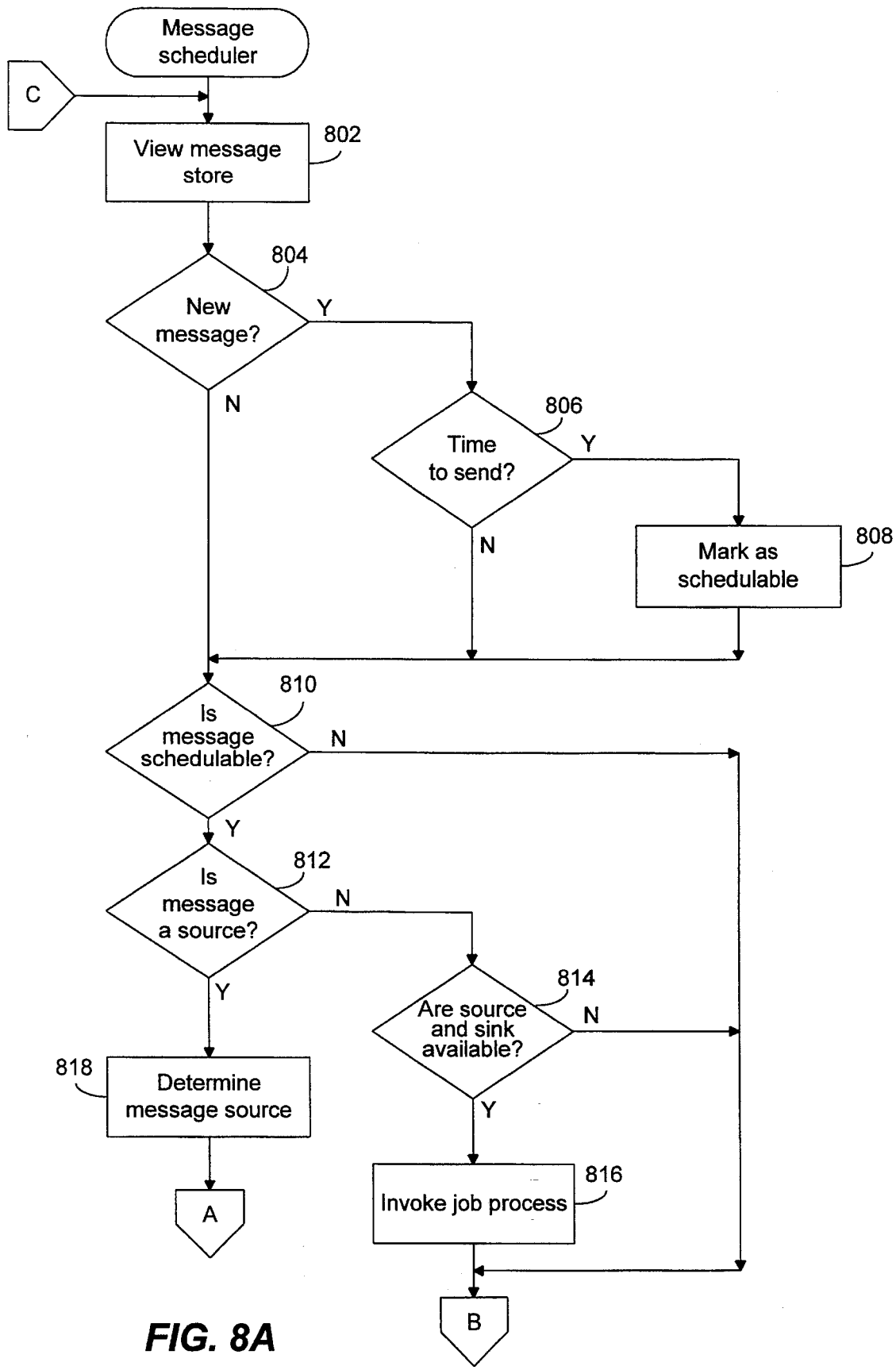
FIGS. 8A and 8B depict a flow chart of the steps performed by the message scheduler.
Figure 8B:
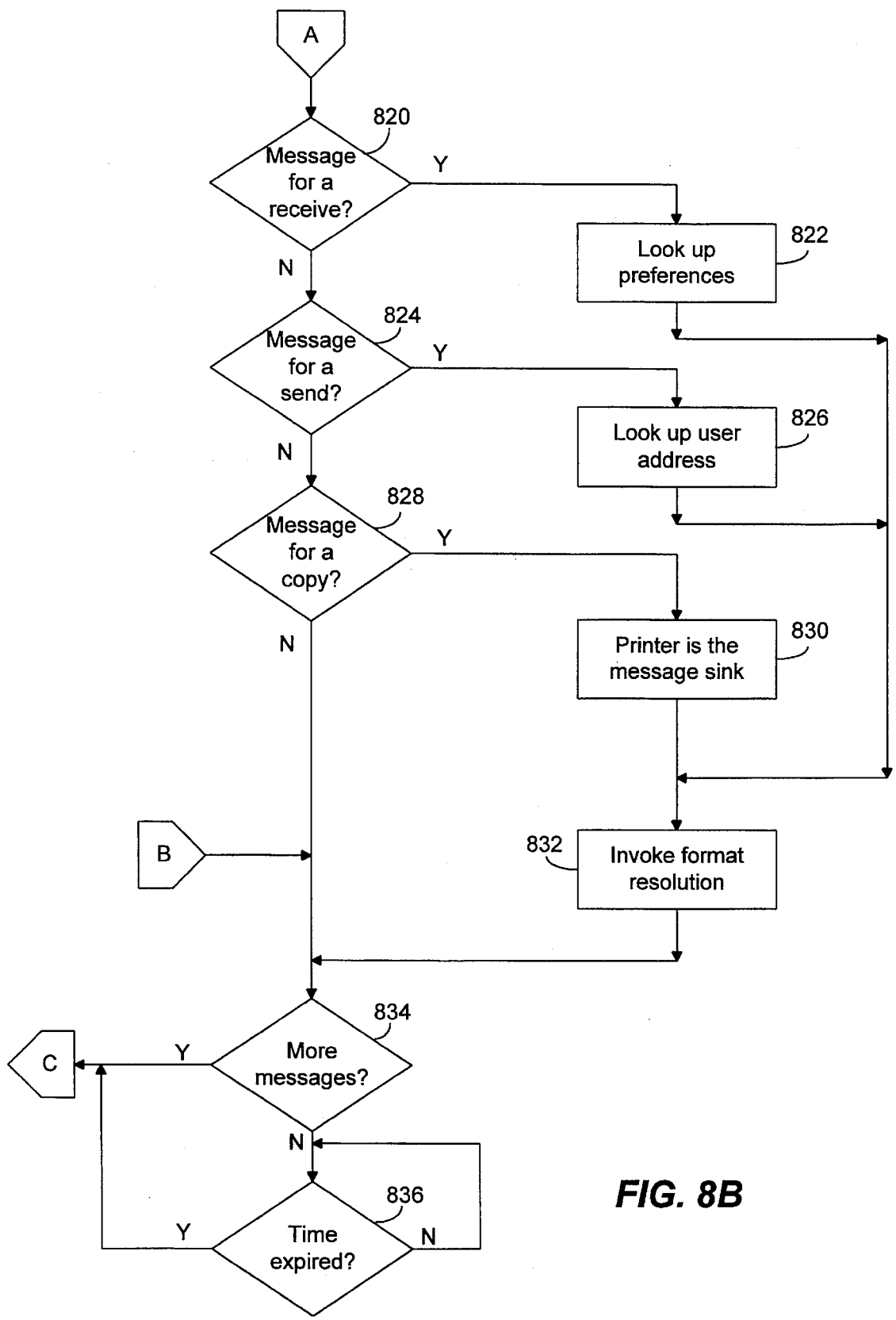

FIGS. 8A and 8B depict a flow chart of the steps performed by the message scheduler 302. The message scheduler 302 is invoked upon system startup of the facsimile machine 200 and continues processing until power down of the facsimile machine 200. The message scheduler 302 is responsible for viewing the message store 316, for invoking format resolution 314 for each new message, and for creating a job process 308, 310 for each target message in the message store 316. The message scheduler 302 views the message store 316 upon receiving an interrupt signifying that a new message has arrived or upon the expiration of a predetermined period of time (i.e., polling). The message scheduler 302 first views the message store 316 by reading each message in the message store 316 one at a time (step 802). The message scheduler 302 then determines if the first message encountered is a new message by reading the status field 506 of the encountered message (step 804). If the encountered message is a new message, the message scheduler 302 determines whether the time to send the encountered message has arrived (step 806). Each message in the message store 316 contains a date and time stamp for the delivery of the message (i.e., the delivery time field 510), thus allowing the user to delay the delivery of messages. The message scheduler 302 compares the current date and time to the date and time in the delivery time field 506 for each message to determine whether the time has arrived to send the message.

If the time has arrived to send the encountered message, the message scheduler 302 updates the status information of the encountered message to indicate that the encountered message is schedulable (step 808). If the time has not arrived to send the encountered message or if the encountered message is not a new message, the message scheduler 302 determines whether the encountered message in the message store 316 is schedulable (step 810). If the encountered message is not schedulable, the message scheduler 302 continues to step 834 in FIG. 8B. However, if the encountered message is schedulable, the message scheduler 302 determines if the encountered message is a source message by reading the type field 508 (step 812). If the encountered message is not a source message, the message scheduler 302 determines whether the message source (or sources) and the message sink (or sinks) are available (step 814). If the message source and the message sink are not available, processing continues to step 834 in FIG. 8B. However, if the message source and the message sink are available, the message scheduler 302 spawns a job process 308, 310 to process the encountered message (step 816). After the message scheduler 302 has invoked the job process, processing continues to step 834 in FIG. 8B. If the encountered message is a source message, the message scheduler 302 determines the message source of the encountered message by reading the message source field 512 of the encountered message (step 818).

The message scheduler 302 next determines if the encountered message is for a receive function (step 820 in FIG. 8B). If the encountered message is for a receive function, the message scheduler 302 looks up the preferences of the destination user to determine the message sink (step 822). The message scheduler 302 looks up the preferences of the destination user in the preferences database 318. After the preferences of the destination user have been determined, the message scheduler 302 continues to step 832. However, if the encountered message is not for a receive function, the message scheduler 302 determines if the encountered message is for a send function (step 824). If the message encountered is for a send, the message scheduler 302 looks up the address of the destination user and determines the message sink (step 826). The lookup for the address of the destination user is performed by the message scheduler 302 in the user database 320. After the lookup of the destination user address has completed, the message scheduler 302 continues to step 832. However, if the encountered message is not for a send function, the message scheduler 302 determines whether the encountered message is for a copy function (step 828).

If the encountered message is for a copy function, the message scheduler 302 determines that the printer is the message sink (step 430). After the message scheduler determines that the printer is the message sink, the message scheduler 302 continues to step 832. If the message encountered was not for a copy function, the function of the encountered message has not been determined (step 828) and processing continues with step 834. If the encountered message is for a receive, send, or copy, and the message sink has been determined, the message scheduler 302 invokes the format resolution module 314 for the encountered message (step 832). The format resolution module 314 is responsible for returning a topology list of renderers for each attachment of the encountered message as well as creating a target message for each message sink of the encountered message. After the format resolution module 314 has completed, the message scheduler 302 determines whether there are more messages in the message store 316 for processing (step 834). If there are more messages in the message store for processing, processing continues with step 802 in FIG. 8A (note "C" in FIG. 8B) and the message scheduler 302 processes another message (step 834). However, if there are no more messages in the message store 316 for processing, the message scheduler 302 waits until receiving an interrupt or until a predetermined period of time has expired before viewing the message store again (step 836).

Figure 9:
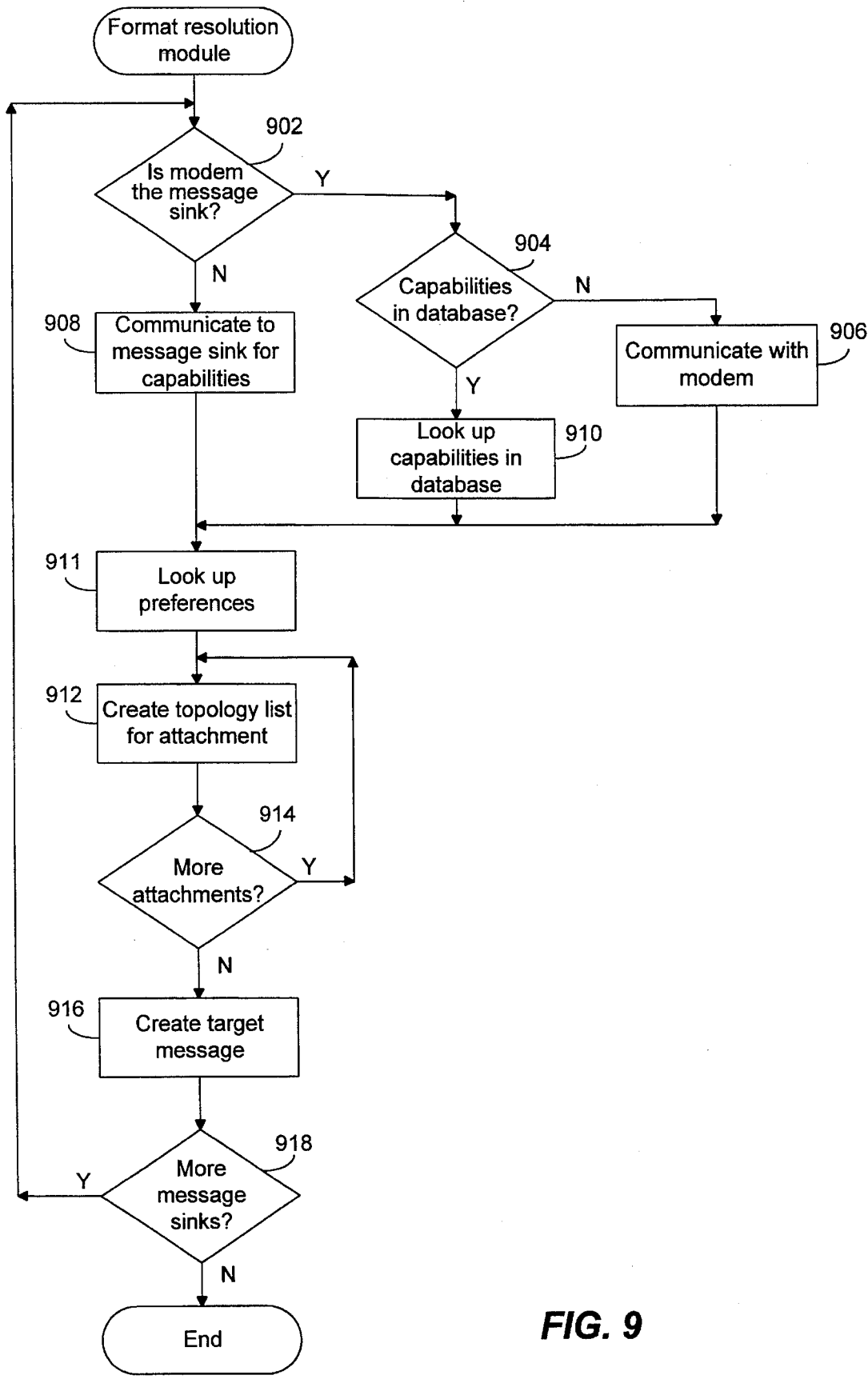
FIG. 9 depicts a flow chart of the steps performed by the format resolution.

FIG. 9 depicts a flow chart of the steps performed by the format resolution module 314. In the preferred embodiment of the present invention discussed herein, the format resolution module 314 is a dynamically linked library that is responsible for returning a topology list of renderers for each attachment in a message as well as creating a target message for each message sink of the message. The first step that the format resolution module 314 performs is to determine whether the message sink is a modem 206 (step 902). If the message sink is a modem, the format resolution module 314 determines if the capabilities of the destination modem are in the capabilities database 326 (step 904). The capabilities of a device, such as a modem, refer to the format of the data that is acceptable to that device. An example of a format acceptable to a device is whether the device interprets the first bit in a serially received byte to be the most significant bit or the least significant bit. Another example of a format acceptable to a device is the width of a document. If the capabilities of the destination modem are in the capabilities database 326, the format resolution module 314 looks up the capabilities in the capabilities database 326 for the destination modem (step 910). However, if the capabilities of the destination modem are not located in the capabilities database 326, the format resolution module 314 invokes the local modem 206 to communicate with the destination modem wherein the format resolution module 314 requests the capabilities of the destination modem (step 906). However, if a modem is not the message sink, the format resolution module 314 communicates to the message sink and requests the capabilities of the message sink (step 908).

After the format resolution module 314 has received the capabilities of the message sink, the format resolution module 314 determines the formatting preferences of the user by accessing the preferences database 318 (step 911). After the formatting preferences of the user have been determined, the format resolution module 314 inputs the capabilities of the message sink, the formatting preferences of the user and the format of the data received from the message source into a preinstalled renderer table to determine a topology of the renderers for converting the data from a format acceptable to the message source into a format acceptable to the message sink. The preinstalled renderer table is a table created off-line which maps the various source formats onto topology lists for a desired destination format. After the topology list for an attachment is created, the format resolution module 314 determines if there are more attachments in the message to be processed (step 914). If there are more attachments in the message to be processed, the format resolution module 314 creates a topology list for another attachment (step 912). However, if no more attachments are contained within the message, the format resolution module 314 creates a target message (step 916). The format resolution module 314 creates the target message with a type field 508 indicating that the message is a target message and with an attachment field containing the file name, pipe or other reference, such as a memory address or a bus address, to the message sink. The format resolution module 314 then determines whether there are more message sinks for the message (step 918). If there are no more message sinks for the message, the format resolution module 314 returns the topology list to the message scheduler 302 and ends processing. However, if there are more message sinks for the message, the format resolution module 314 creates a topology list for each attachment and a target message for the message sink. After each message sink has been processed, the format resolution module 314 returns the topology list to the message scheduler 302 and processing ends.

Figure 10:
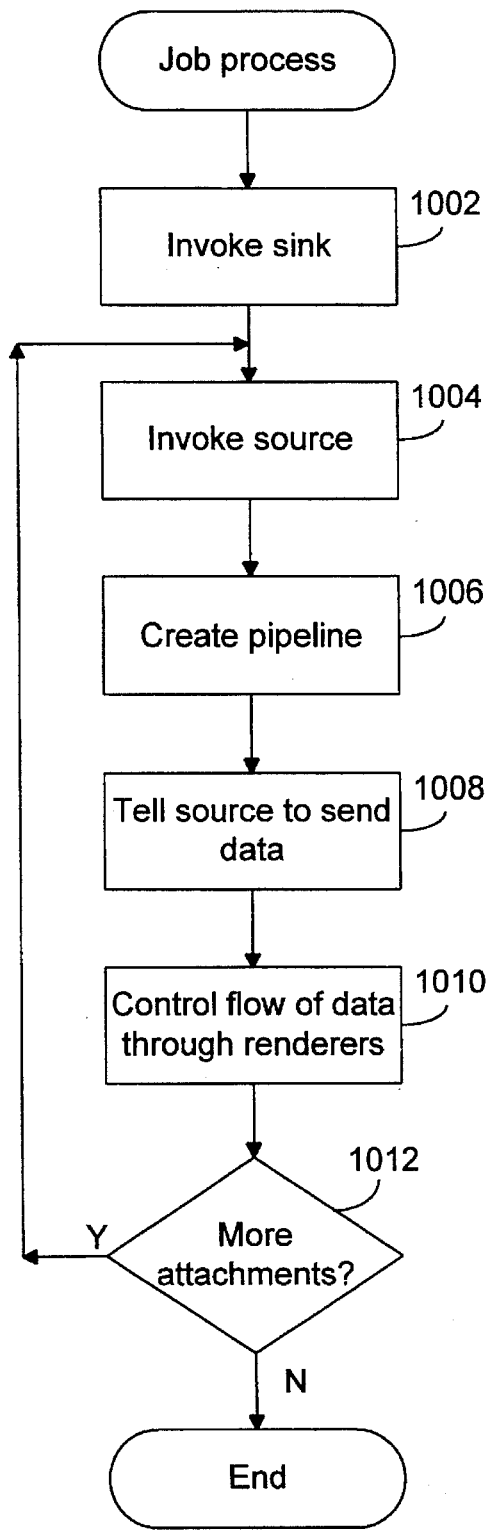
FIG. 10 depicts a flow chart of the steps performed by the job process.

FIG. 10 depicts a flow chart of the steps performed by the job process 308, 310. The job process 308, 310 is responsible for initiating the renderers in a topology list for each attachment and for sending data between the source message, the renderers in the topology list, and to the target message. The job process 308, 310 begins processing by invoking the message sink (step 1002). After the message sink has been invoked, the job process 308, 310 invokes the message source (or sources) (step 1004). Next, the job process 308, 310 creates a pipeline (a path) from the message source through the renderers to the message sink (step 1006). The job process then tells the message source to start sending the data (step 1008). As the message source is sending the data, the job process controls a flow of the data through the renderers and to the message sink (step 1010). After one attachment has been processed and all of the data from the message source for the attachment has been sent to the message sink, the job process determines if there are more attachments to be processed (step 1012). If there are more attachments to be processed, the job process processes another attachment (step 1012). However, if there are no more attachments to be processed, the job process terminates.

While the present invention has been described with reference to a preferred embodiment thereof, those skilled in the art will know of various changes in form that may be made without departing from the spirit and scope of the claimed invention as defined in the appended claims.

We claim:

1. In a communication device for use by a user, the communication device having a message source, a message sink, a database, a format resolution module, and a message scheduler for processing messages, wherein each message sink has capabilities for the format of data acceptable to that message sink, wherein the user has preferences and wherein the message has an attachment, a method for processing messages comprising the steps of:

under the control of the communication device,
receiving user input;
creating a message in response to receiving the user input wherein the created message has a message source and a message sink;
storing the message in a message store;
determining when a message has arrived in the message store;
processing new messages in the message store by the message scheduler to create schedulable messages;
when a message is a schedulable message,
spawning a job process by the message scheduler to send data in the message from the message source to the message sink; and
when the message is a source message,
determining the message sink by the message scheduler by accessing a database;
invoking a format resolution module by the message scheduler to determine a method for converting data within the message from a format acceptable to the message source to a format acceptable to the message sink; and
under the control of the format resolution module,
determining capabilities of the message sink;
determining preferences of the user;
creating a topology list of renderers for each attachment in the message for converting data in the message from a format acceptable to the message source to a format acceptable to the message sink using the preferences of the user; and
creating a target message for each message sink for the message.

2. The method of claim 1 wherein the preferences of the user includes overlay preferences for stylistic information added to a message and branding preferences for a date and time to be printed with a message.

3. The method of claim 1 wherein the communication device has a capabilities database, wherein the step of determining the capabilities of the message sink includes the steps of:

when the message sink is a modem, determining the capabilities of the destination modem by reading the capabilities database;
when reading the capabilities database, if an entry for the destination modem is not found, determining the capabilities of the destination modem; and
when the message sink is not a modem, communicating to the message sink to determine the capabilities of the destination device.

4. In a facsimile machine, the facsimile machine having a message source and a message sink, each having acceptable data formats, wherein the facsimile machine has a plurality of renderers for converting data, a method for sending a message comprising the steps of:

receiving user input into the facsimile machine;

determining the message sink by examining the user input;

determining a method for converting data in the message from a format acceptable to the message source to a format acceptable to the message sink;

creating a list of renderers for each attachment wherein executing each renderer in the list in an order specified by the list converts the data in the message from a format acceptable to the message source to a format acceptable to the message sink;

creating a target message for each message sink of the message; and generating a path of execution for sending the data in the message from the message source to the message sink and for converting the data in the message.

* * * * *